United States Patent [19]

Kensok et al.

[11] Patent Number: 4,934,271
[45] Date of Patent: Jun. 19, 1990

[54] ROTARY CAM LOAD POSITIONING APPARATUS

[75] Inventors: Timothy J. Kensok, Minnetonka; Peter H. Van Sloun, Hopkins, both of Minn.

[73] Assignee: Honeywell Inc., Minneapolis, Minn.

[21] Appl. No.: 386,747

[22] Filed: Jul. 31, 1989

[51] Int. Cl.$^5$ .............................................. F42B 23/24
[52] U.S. Cl. .................................. 102/293; 89/37.13; 102/401
[58] Field of Search ............... 102/401, 425, 427, 293; 89/1.35, 1.8, 1.815, 37.05, 37.09, 37.13

[56] References Cited

U.S. PATENT DOCUMENTS 4,662,265  5/1987  Becker et al. ................... 89/37.09
4,848,236  7/1989  Hembisc .......................... 102/427

Primary Examiner—Charles T. Jordan
Attorney, Agent, or Firm—Roger W. Jensen

[57] ABSTRACT

A rotary cam load positioning apparatus has a base, a bottom cam rotatably mounted on the base, and a top cam rotatably mounted on the bottom cam. The rotary cams have cylindrical wedge-shaped configurations with respective upper and lower surfaces disposed in inclined relation to one another. Thus, rotation of the top cam relative to the bottom cam will produce a change in the elevation position of a load supported on the upper surface of the top cam relative to the base, whereas rotation of both top and bottom cams together will produce a change in the azimuth position of the load supported on the upper surface of the top cam relative to the base.

20 Claims, 5 Drawing Sheets

ROTARY CAM LOAD POSITIONING APPARATUS

BACKGROUND OF THE INVENTION

The Government has rights in this invention pursuant to Contract No. DAAA21-87-C-0201, awarded by the Department of the Army.

FIELD OF THE INVENTION

The present invention generally relates to supporting and positioning a load and, more particularly, is concerned with a rotary cam load positioning apparatus.

DESCRIPTION OF THE PRIOR ART

A wide area mine (WAM) submunition is currently being developed for the U.S. military. The WAM (also termed a "smart" mine) submunition emplaced on the ground has a noise sensor that can detect the sounds, or acoustic signature, of a heavy vehicle, such as a tank, in a target area, for instance, of a 200 meter diameter circle around it.

When a tank is detected in the target area, the WAM submunition launches a sublet from its launcher tube on a ballistic trajectory over the target area. Then, a special chute is deployed which slows the sublet and places it in an inward spiraling descent over the target area with a scanner in the sublet scanning the area beneath the descending sublet until the target is located. Once the sublet has a fix on the target, a warhead detonates, sending an explosively-formed projectile into the target at a high velocity to achieve destruction of the target.

In order for the WAM submunition to launch the sublet over the target, its launcher tube must be properly aimed in azimuth and elevation to project the sublet on a trajectory over the target area. Therefore, an apparatus capable of accurately pointing the launcher tube in the correct direction is vital for the ultimate success of the WAM submunition.

SUMMARY OF THE INVENTION

The present invention provides a rotary cam load supporting and positioning apparatus designed to satisfy the aforementioned needs. The apparatus of the present invention is capable of positioning a load with high accuracy and minimum force input. The apparatus utilizes a pair of rotary top and bottom cams to change the angle between a stationary support base and a load, such as a launcher tube base and the launcher tube.

The cams have circular wedge shapes and are constructed from a low profile right cylinder which is cut diagonally. The maximum change in elevation angle is twice the angle of the diagonal cut to the horizontal which occurs when the top cam is rotated 180 degrees with respect to the bottom cam. Intermediate angles of rotation cause less of an angle change. The azimuth angle is controlled by rotation of both the top an bottom cams with respect to the base. The elevation angle is controlled by rotation of the top cam with respect to the bottom cam.

The nature of the rotary wedge-shaped cams is such that the necessary tilting motion can be achieved through a purely rotational input. For many uses of the load positioning apparatus of the present invention, the need for only a rotational input to operate the cams can be implemented merely by provision of a relatively simple motor drive system. In the application of the load positioning apparatus of the present invention in the WAM submunition, the rotational energy for changing both elevation and azimuth angles of the launcher tube relative to the launcher tube base is obtained from a coiled flat drive spring. One end of the spring is attached to the base and the other to the top cam. Latches hold the spring in its wound up position.

Accordingly, the present invention is directed to a load supporting and positioning apparatus which comprises: (a) a base; (b) a bottom cam rotatably mounted on the base and having upper and lower surfaces disposed in inclined relation to one another; and (c) a top cam rotatably mounted on the bottom cam and having upper and lower surfaces disposed in inclined relation to one another such that rotation of the top cam relative to the bottom cam will produce a change in the elevation position of a load supported on the upper surface of the top cam relative to the base, whereas rotation of both top and bottom cams together will produce a change in the azimuth position of the load supported on the upper surface of the top cam relative to the base. The apparatus further includes drive means coupled between one of the top or bottom cams and the base for causing rotation of the one cam relative to the base.

Also, the apparatus includes an intercam latch, a plurality of azimuth latches and a plurality of elevation latches. The intercam latch is mounted on one of the cams and allocatable between operative and inoperative positions for latching with and unlatching from the other cam such that the cams can rotate together when the intercam latch is in the operative position and move relative to one another when the intercam latch is in the inoperative position.

The azimuth stops are mounted to the base. Each azimuth stop is selectively movable from an inoperative to operative position relative to the one cam to actuate the intercam latch from the operative to inoperative position and to block further rotation of the one cam so as to maintain the one cam stationary at a selected azimuth position of the load supported on the upper cam.

The elevation stops are mounted to the one cam and movable between operative and inoperative positions relative to the other cam for blocking and unblocking the other cam from moving relative to the one cam. Actuatable means are provided for engaging selected ones of the elevation stops to move the same from the operative to inoperative position. Further, the apparatus includes an azimuth release latch for releasably latching the one cam at a predetermined initial position relative to the base.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE DRAWINGS

Figure 1:
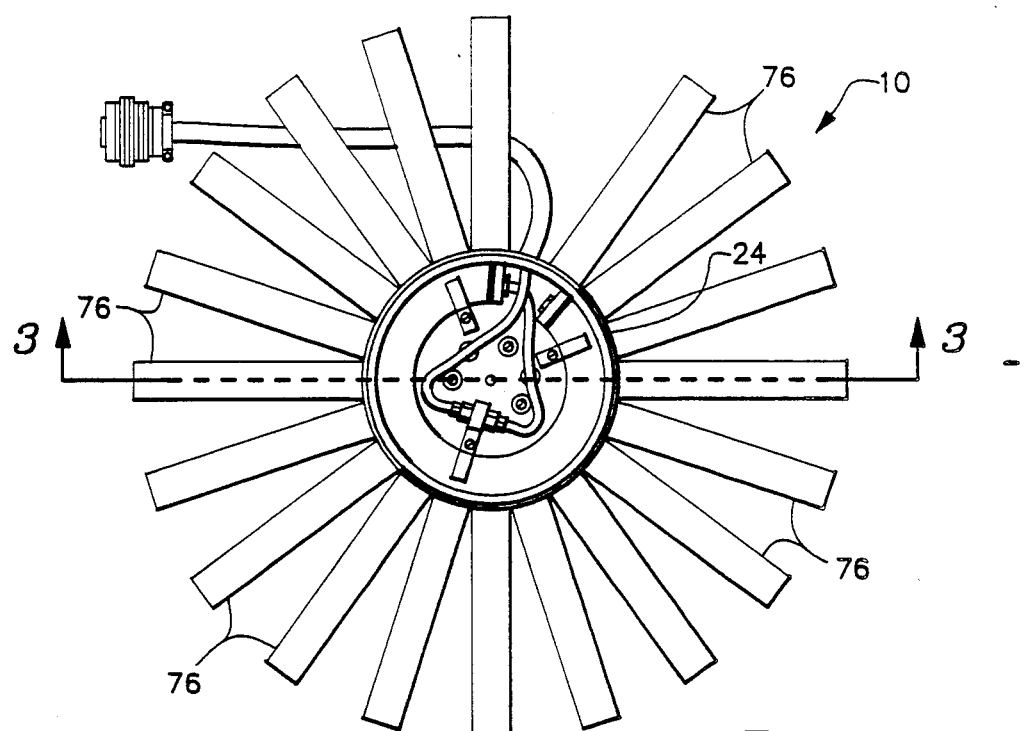
FIG. 1 is a top plan view of a WAM submunition incorporating a rotary cam load positioning apparatus in accordance with the present invention.
Figure 2:
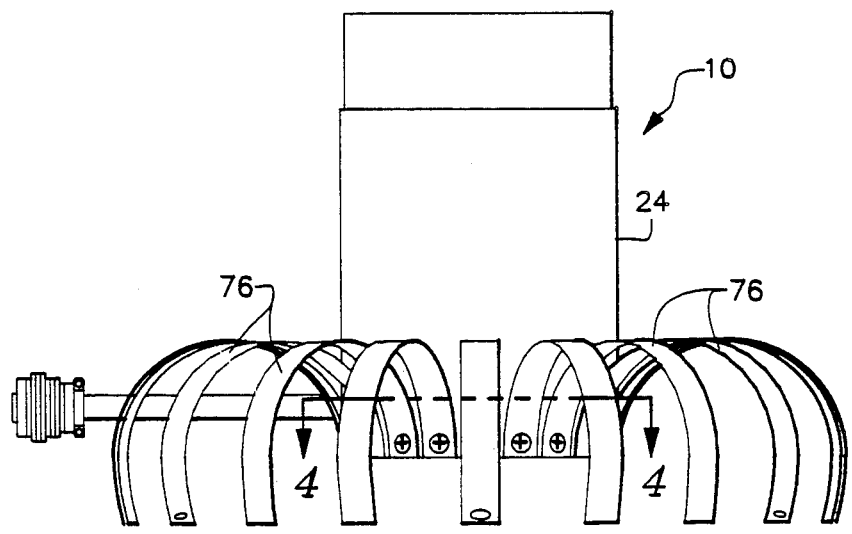
FIG. 2 is a side elevational view of the submunition of FIG. 1.
Figure 3:
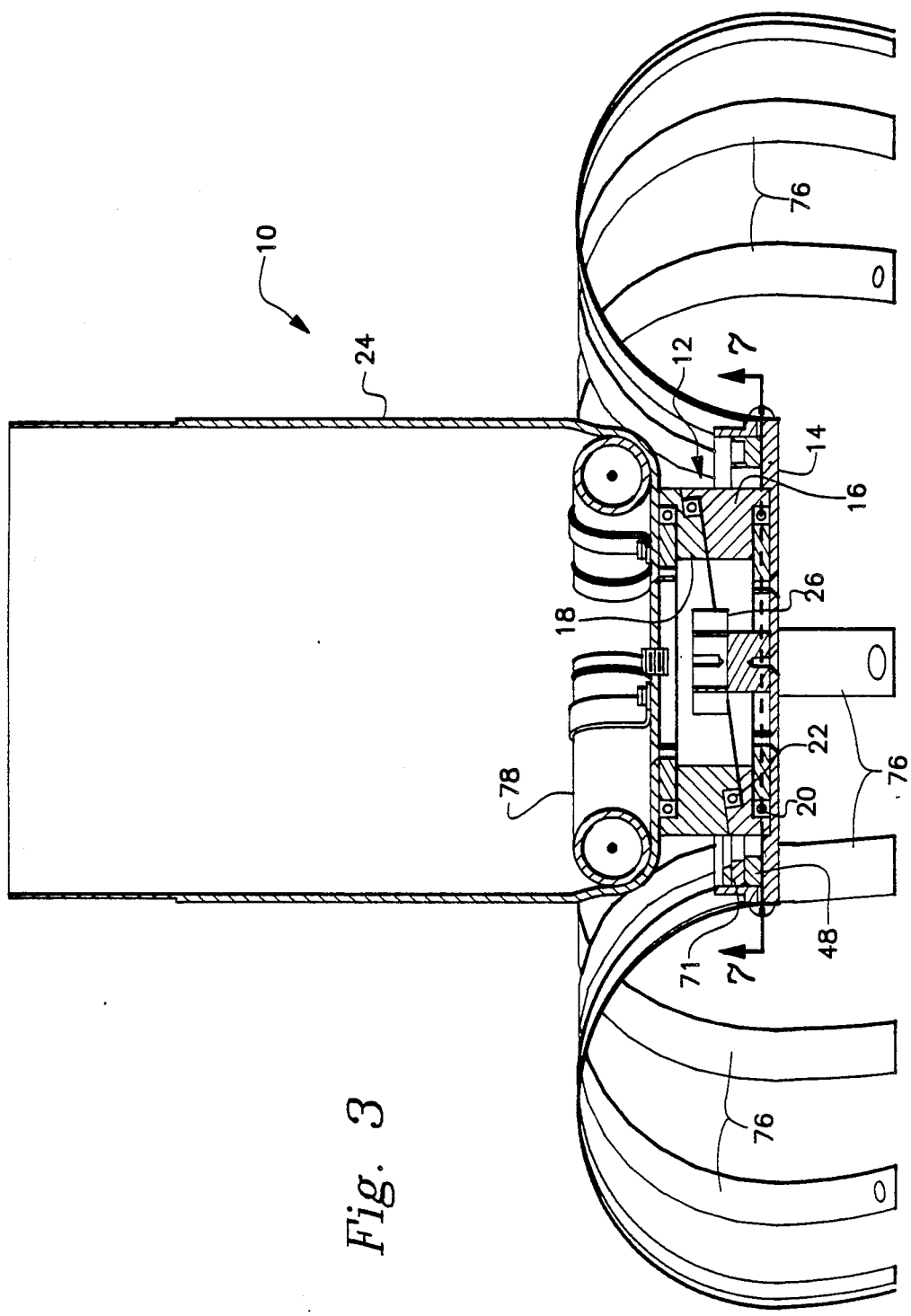
FIG. 3 is an enlarged axial sectional view of the WAM submunition taken along line 3—3 of FIG. 1, illustrating a pair of circular wedge-shaped rotary top and bottom cams of the positioning apparatus of the present invention.

Referring now to the drawings, and in particular to FIGS. 1-3, there is shown a wide area mine (WAM) submunition 10 which incorporates a rotary cam load positioning apparatus, generally designated 12 and constructed in accordance with the principles of the present invention. Although the apparatus 12 is illustrated applied to the WAM submunition 10 it is readily adaptable for use in other applications.

In its basic components, the rotary cam load positioning apparatus 12 includes a stationary support base 14 and a pair of bottom and top rotary cams 16, 18. As can be seen in FIG. 3, the bottom cam 16 is rotatably mounted by a bearing 20 on the base 14 and the top cam 18 is rotatably and eccentrically mounted by a bearing 22 on the bottom cam 16. The apparatus 12 is capable of positioning or aiming a load, such as a launcher tube 24 containing a sublet (not shown), with high accuracy and minimum force input. The apparatus 12 utilizes the pair of rotary bottom and top cams 16, 18 to change the angle between the base 14 and the launcher tube 24, such as the launcher tube base and the load, respectively.

Preferably, the base 14 has a low profile circular configuration and the bottom and top cams 16, 18 have cylindrical wedge shapes. The cams 16, 18 are constructed from a low profile right cylinder which is cut diagonally. The cams 16, 18 thus each have a cylindrical outer surface 16A, 18A and upper and lower surfaces 16B, 16C and 18B, 18C which extend in respective planes which are inclined relative to one another. In particular, the lower surface 16C of the bottom cam 16 and upper surface 18B of the top cam 18 are both generally perpendicular to the coincident central rotational axes A (FIGS. 9-12) of the cams. On the other hand, the upper surface 16B of the bottom cam 16 and lower surface 18C of the top cam 18 are both generally inclined relative to their respective lower surface 16C and upper surface 18B. The maximum change in elevation angle is twice the angle of the diagonal cut (or the angle of inclination between the respective surfaces of each cam) to the horizontal which occurs when the top cam 18 is rotated 180 degrees with respect to the bottom cam 16. Intermediate angles of rotation cause less of an angle change.

As can be readily understood from FIGS. 9-12, the azimuth position of a load, as represented by the arrow L, is controlled by rotation of both the bottom and top cams 16, 18 with respect to the base 14. The elevation position is controlled by rotation of the top cam 18 with respect to the bottom cam 16. Thus rotation of the top cam 18 relative to the bottom cam 16 will produce a change in the elevation position of the load supported on the upper surface 18B of the top cam 18 relative to the base 14, whereas rotation of both bottom and top cams 16, 18 together will produce a change in the azimuth position of the load supported on the upper surface 18B of the top cam 18 relative to the base 14.

The nature of the rotary wedge-shaped cams 16, 18 is such that the necessary tilting motion can be achieved through a purely rotational input. For many uses of the load positioning apparatus 12 of the present invention, the rotational input to operate the cams 16, 18 can be implemented merely by provision of a relatively simple motor drive system. In the application of the load positioning apparatus 12 of the present invention in the WAM submunition 10, the rotational energy for changing both elevation and azimuth angles of the launcher tube 24 relative to the launcher tube base 14 is obtained from a drive means in the form of a coiled flat drive spring 26, as illustrated in wound condition in FIG. 7. One end of the spring 26 is attached to the base 14 and the other to the top cam 18. Means to be described below are provided to hold the spring 26 in its wound up position. The winding of the spring 26 biases the top cam 18 for rotation in a given direction.

Referring to FIGS. 4-8, there is illustrated an exemplary form of means in the apparatus 12 for preventing rotation of the cams 16, 18 relative to one another and for holding the spring 26 in the wound condition. Such means includes an intercam latch 28, an azimuth release latch 30, a plurality of azimuth stops 32 and a plurality of elevation stops 34.

Figure 4:
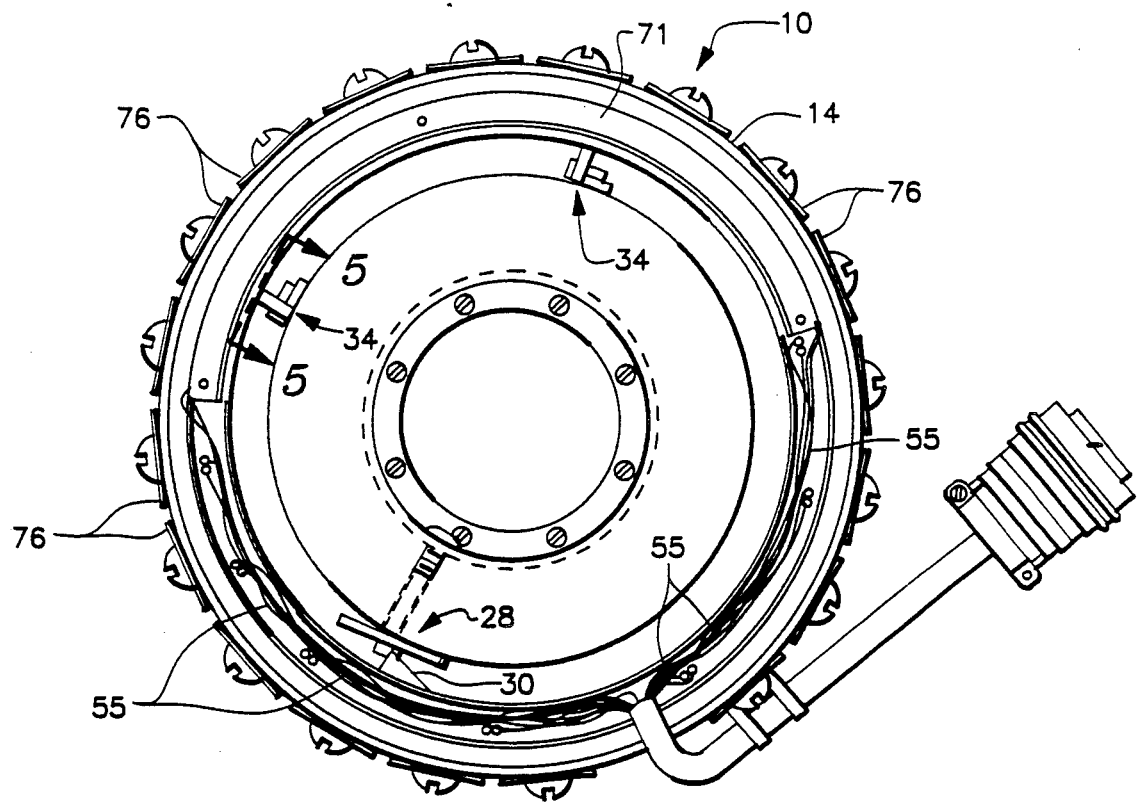
FIG. 4 is an enlarged cross-sectional view of the WAM submunition taken along line 4—4 of FIG. 2, illustrating the submunition rotated clockwise from its angular position in FIG. 2.
Figure 5:
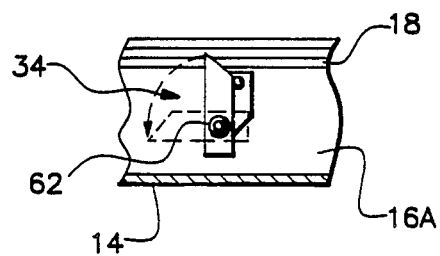
FIG. 5 is a fragmentary view of the rotary cams of the positioning apparatus as seen along line 5—5 of FIG. 4, illustrating an elevation stop of the apparatus disposed in an operative, blocking position.
Figure 7:
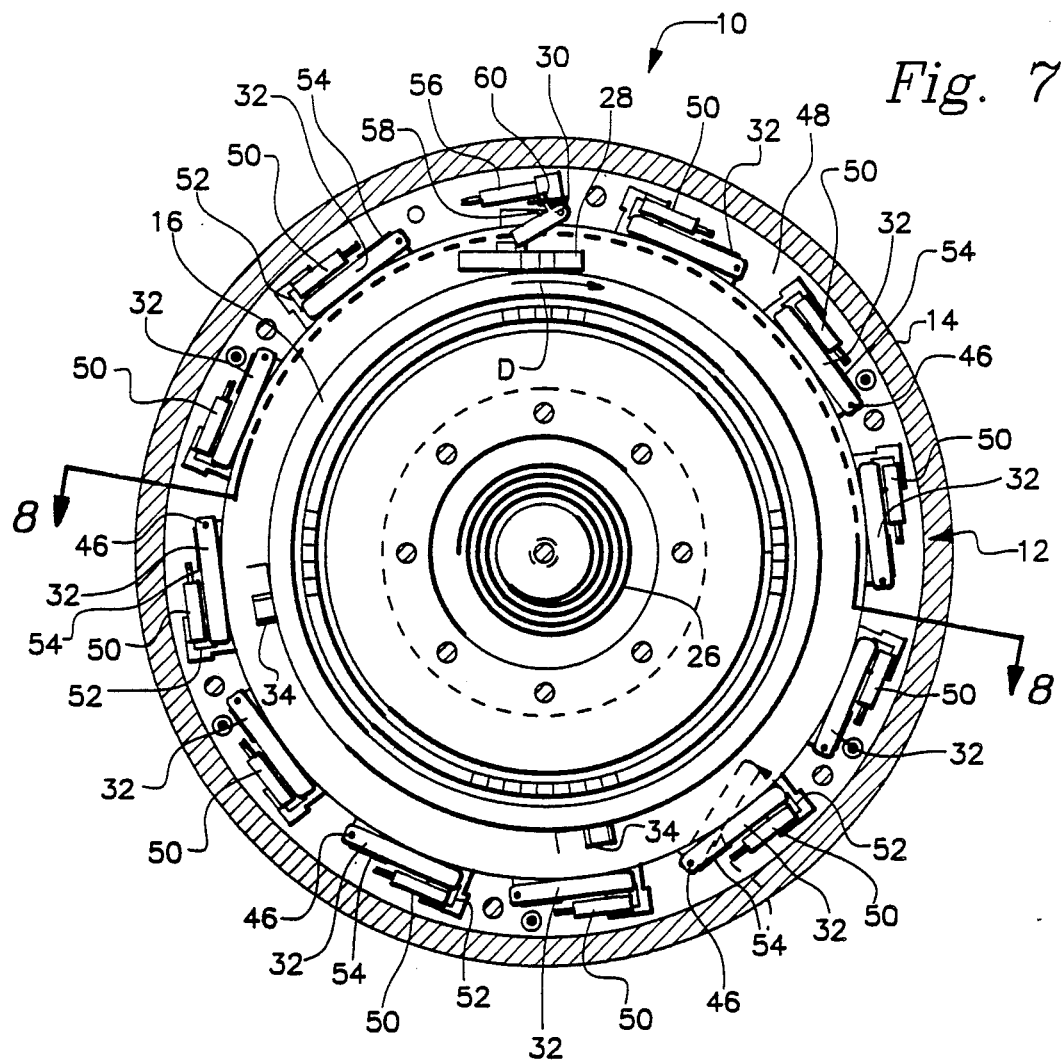
FIG. 7 is an enlarged cross sectional of the WAM submunition taken along line 4—4 of FIG. 2, illustrating a plurality of azimuth stops of the apparatus.
Figure 8:
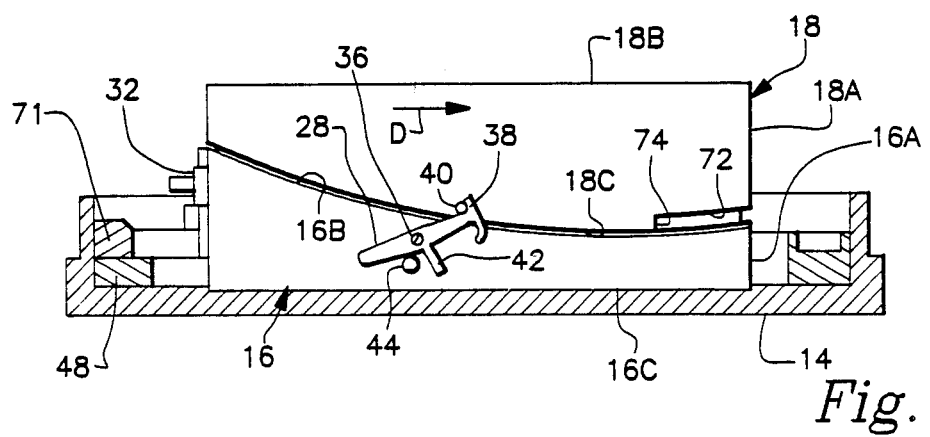
FIG. 8 is an elevational view of the rotary cams of the apparatus as seen along line 8—8 of FIG. 7.
Figure 9:
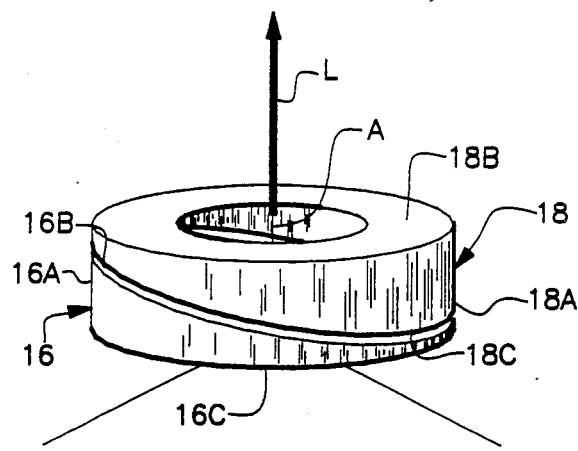
FIGS. 9-12 are schematical perspective views of the top and bottom rotary cams of the apparatus of FIG. 3, illustrating different angular positions of the top surface of the top cam relative to the bottom surface of the bottom cam.
Figure 10:
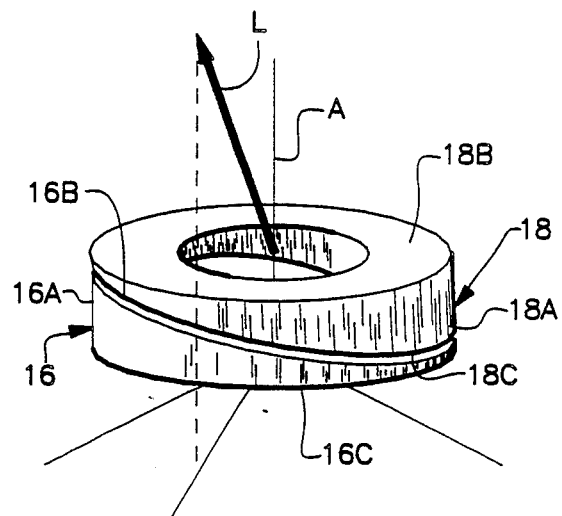
Figure 11:
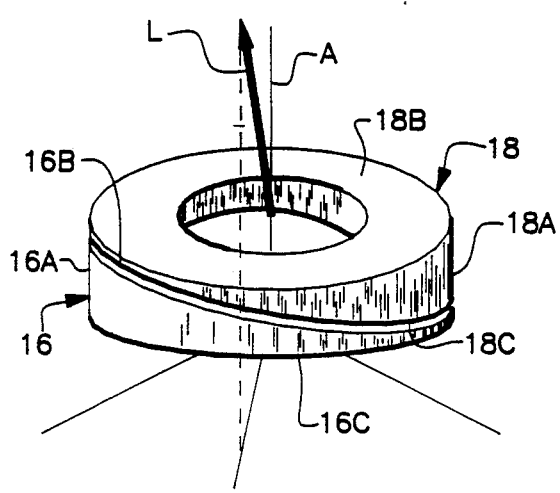
Figure 12:
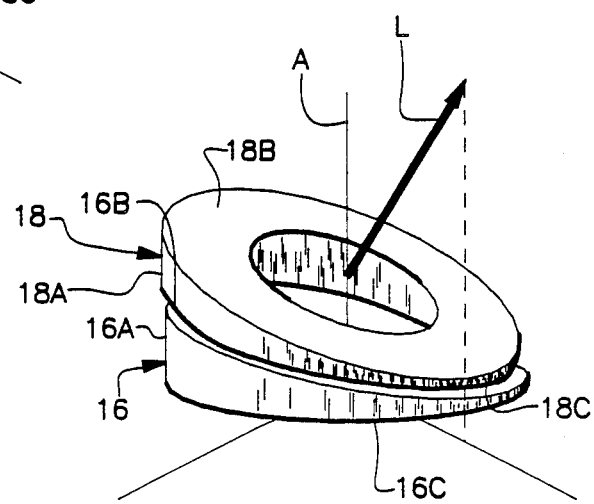

As shown in FIGS. 4, 7 and 8, the intercam latch 28 of the apparatus 12 is rotatably mounted by pivot pin 36 to the outer surface 16A of the bottom cam 16. The intercam latch 28 has a hook element 38 formed on one end which hooks in front of a pin 40 projecting outwardly from the outer surface 18A of the top cam 18 to prevent rotation of the top cam 18 in the direction of the arrow D relative to the bottom cam 16 due to the bias of the wound drive spring 26. The intercam latch 28 is allocatable between operative and inoperative positions for latching with and unlatching from the top cam 18. As seen in FIG. 8, the intercam latch 28 is in its operative position causing the cams 16, 18 to rotate together. The latch 28 will pivot clockwise to its inoperative position due to engagement of a selected one of the azimuth stops 32 (FIG. 7) with a depending finger 42 on the latch 28. The pivotal movement of the latch 28 and rotation of the bottom cam 16 terminates when the finger 42 engages a stop pin 44 projecting from the bottom cam 16 below the latch 28. Once the latch 28 has moved to its inoperative position, the top cam 18 can then continue to rotate relative to the bottom cam 16.

As seen in FIG. 7, the azimuth stops 32 of the apparatus 12 are pivotally mounted at 46 to the underside of a lower interior flange 48 on the base 14. The azimuth stops 32 are displaced 30 degrees from one to the next. Actuating cylinders 50 and release springs 52 are disposed on the base flange 48 and normally retain the stops 32 in the inoperative, retracted positions seen in FIG. 7. The azimuth stops 32 are preloaded by biasing leaf springs 54 to pivotally move from the retracted positions toward the bottom cam 16 to operative extended positions.

When a selected one of the cylinders 50 is activated (extended) electrically via signals received through conductors 55 shown in FIG. 4, it moves the one release spring 52 from engagement with the azimuth stop 32, permitting the one stop 32 to pivot from the solid line retracted inoperative position to the dashed line extended operative position, as shown in FIG. 7, where it extends into the path of the intercam latch finger 42 and stop pin 44 so as to unlatch the latch 28 and block further rotation of the bottom cam 16 and thereby maintain the bottom cam stationary at a selected azimuth position of the load supported on the upper cam 18.

The azimuth release latch 30 is provided for releasably latching the bottom cam 16 at a predetermined initial starting position relative to the base 14 via engagement with the stop pin 44. An actuating cylinder 56 is disposed on the base flange 48 and normally retains the release latch 30 in the extended latching position seen in FIG. 7. The azimuth release latch 30 is preloaded by a biasing leaf spring 58 to move to the extended latching position adjacent the bottom cam 16 from a retracted unlatching position. The cylinder 56 is initially in the retracted position, permitting the latch 30 to initially assume the extended latching position When the cylinder 56 is activated (extended) electrically via signals received through conductors 55, it engages and pivots the release latch 30 via a finger 60 thereon against the biasing spring 58 to the retracted unlatching position, which permits the bottom cam 16 to rotate with the top cam 18.

Figure 6:
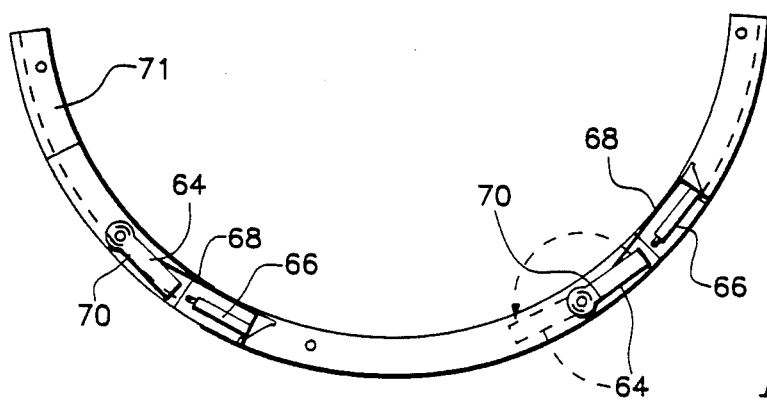
FIG. 6 is a bottom plan view of a pair of whacker elements of the apparatus used to toggle the elevation stops to inoperative, unblocking positions.

As seen in FIGS. 4, 5, 7 and 8, the elevation stops 34 of the apparatus 12 are pivotally mounted by pivot pins 62 to the outer surface 16A of the bottom cam 16 for pivotal movement between vertical operative and horizontal inoperative positions relative to the top cam 18 for blocking and unblocking the top cam 18 from moving relative to the bottom cam 16. As illustrated in FIG. 6, allocatable means in the form of pivotal whacker bars 64, actuating cylinders 66, release springs 68 and biasing coil springs 70 are mounted to the underside of an upper interior flange 71. A selected cylinder 66 is actuated (extended) electrically via signals received through conductors 55 for releasing the whacker bar for movement from the cocked, retracted position along an arcuate path to the 180-degree displaced triggered position, as shown in dashed line form in FIG. 6, for engaging an elevation stop 34 to move the same from the vertical operative to horizontal inoperative position as shown in dashed line form in FIG. 5.

In the exemplary embodiment, three elevation angles, 82, 73 or 65 degree, may be selected. The eccentric cam to cam counterclockwise rotation permits the elevation stops 34 to be located at the edge of the bottom cam 16. A recess 72 defines a shoulder 74 along a portion of the lower edge of the top cam 18 to provide a stop against which one of the elevation stops 34 in the vertical operative position can abut to stop rotation of the top cam 18 relative to the bottom cam 16.

The operational sequence of the various latches and stops is as follows: (1) Selected elevational stops 34 are toggled from the operative to inoperative positions leaving the one stop for the selected elevation still standing in the vertical operative position. (2) A selected azimuth stop 32 is next released. (3) The azimuth release latch 30 is next withdrawn from its latching to unlatching position. (4) Both cams 16, 18 are rotated together to the selected released azimuth stop 32. (5) The top cam 18 is unlatched from the bottom cam 16 by releasing the intercam latch 28. (6) Finally, the top cam 18 continues rotation to the selected elevation stop 34.

The advantages of the apparatus 12 are that its height is low which enhances dynamics when use in the WAM submunition application, it has rapid function time—well under one second, it is structurally sound to withstand over 200,000 pound launch force, compact latch and stop hardware, low weight, ability to select three elevation angles and twelve azimuth angles, self-contained operational power, and low energy input signals.

Several other components of the WAM submunition—a plurality of erection members 76 and a gas generator 78—are shown in FIGS. 1-3. HoWeVer, since these components do not relate to the rotary cam load positioning apparatus 12 of the present invention, their functions need not be discussed herein.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A load supporting and positioning apparatus, comprising:
    (a) a base;
    (b) a bottom cam rotatably mounted on said base and having upper and lower surfaces disposed in inclined relation to one another;
    (c) a top cam rotatably mounted on said bottom cam and having upper and lower surfaces disposed in inclined relation to one another such that rotation of said top cam relative to said bottom cam will produce a change in the elevation position of a load supported on said upper surface of said top cam relative to said base, whereas rotation of both top and bottom cams together will produce a change in the azimuth position of the load supported on the upper surface of said top cam relative to said base; and
    (d) an intercam latch mounted on one of said cams and being actuatable between operative and inoperative positions for latching with and unlatching from the other cam such that said cams can rotate together when said intercam latch is in said operative position and move relative to one another when said intercam latch is in said inoperative position.

2. The apparatus of claim 1 wherein said top cam is mounted in eccentric relation to said bottom cam.

3. The apparatus of claim 1 further comprising:
    a plurality of azimuth stops mounted to said base, each azimuth stop being selectively movable from an inoperative to operative position relative to said one cam to actuate said intercam latch from said operative to inoperative position and to block further rotation of said one cam so as to maintain said one cam stationary at a selected azimuth position of the load supported on said top cam.

4. The apparatus of claim 1 further comprising:
drive means coupled between said base and one of said top and bottom cams for causing rotation of said one cam relative to said base.

5. A load supporting and positioning apparatus, comprising:
(a) a base;
(b) a bottom cam rotatably mounted on said base and having upper and lower surfaces disposed in inclined relation to one another;
(c) a top cam rotatably mounted on said bottom cam and having upper and lower surfaces disposed in inclined relation to one another such that rotation of said top cam relative to said bottom cam will produce a change in the elevation position of a load supported on said upper surface of said top cam relative to said base, whereas rotation of both top and bottom cams together will produce a change in the azimuth position of the load supported on the upper surface of said top cam relative to said base; and
(d) drive means coupled between said base and one of said top and bottom cams for causing rotation of said one cam relative to said base; and
(e) an intercam latch for releasably latching said top and bottom cams to one another such that said cams will rotate together.

6. The apparatus of claim 5 further comprising:
an azimuth release latch for releasably latching said one cam at a predetermined initial position relative to said base.

7. The apparatus of claim 5 further comprising:
a plurality of elevation stops mounted to said one cam and being operable for stopping said other cam at selectable positions relative to said one cam.

8. The apparatus of claim 7 further comprising:
means being allocatable for engaging selected ones of said elevation stops to move the same from said operative to inoperative position.

9. The apparatus of claim 5 further comprising:
a plurality of azimuth stops mounted to said base, each azimuth stop being selectively movable from an inoperative to operative position relative to said one cam to block rotation of said one cam and so as to maintain said one cam stationary at a selected azimuth position of the load supported on said top cam.

10. The apparatus of claim 5 wherein said drive means is a spring being wound so as to bias said one cam for rotation in a given direction.

11. A load supporting and positioning apparatus, comprising:
(a) a base;
(b) a bottom cam rotatably mounted on said base and being of generally cylindrical wedge-shaped configuration and having upper and lower surfaces extending in respective planes which are inclined relative to one another;
(c) a top cam rotatably mounted on said bottom cam and being of generally cylindrical wedge-shaped configuration and having upper and lower surfaces extending in respective planes which are inclined relative to one another such that rotation of said top cam relative to said bottom cam will produce a change in the elevation position of a load supported on said upper surface of said top cam relative to said base, whereas rotation of both top and bottom cams together will produce a change in the azimuth position of the load supported on the upper surface of said top cam relative to said base; and
(d) an intercam latch rotatably mounted on said bottom cam and being actuatable between operative and inoperative positions for latching with and unlatching from said top cam such that said cams can rotate together when said intercam latch is in said operative position and move relative to one another when said intercam latch is in said inoperative position.

12. The apparatus of claim 11 wherein said top cam is mounted in eccentric relation to said bottom cam.

13. The apparatus of claim 11 further comprising:
a plurality of azimuth steps mounted to said base, each azimuth stop being selectively movable from an inoperative to operative position relative to said bottom cam to actuate said intercam latch from said operative to inoperative position and to block rotation of said bottom cam so as to maintain said bottom cam stationary at a selected azimuth position of the load supported on said top cam.

14. The apparatus of claim 11 further comprising:
drive means coupled between said top cam and said base for causing rotation of said top cam relative to said base.

15. A load supporting and positioning apparatus, comprising:
(a) a base;
(b) a bottom cam rotatably mounted on said base and being of generally cylindrical wedge-shaped configuration and having upper and lower surfaces extending in respective planes which are inclined relative to one another;
(c) a top cam rotatably mounted on said bottom cam and being of generally cylindrical wedge-shaped configuration and having upper and lower surfaces extending in respective planes which are inclined relative to one another such that rotation of said top cam relative to said bottom cam will produce a change in the elevation position of a load supported on said upper surface of said top cam relative to said base, whereas rotation of both top and bottom cams together will produce a change in the azimuth position of the load supported on the upper surface of said top cam relative to said base;
(d) drive means coupled between said top cam and said base for causing rotation of said top cam relative to said base; and
(e) an intercam latch for releasably latching said top and bottom cams to one another such that said cams will rotate together.

16. The apparatus of claim 15 wherein said drive means is a spring being wound so as to bias said top cam for rotation in a given direction.

17. The apparatus of claim 15 further comprising:
an azimuth release latch for releasably latching said bottom cam at a predetermined initial position relative to said base.

18. The apparatus of claim 15 further comprising:
a plurality of elevation stops mounted to said bottom cam and being movable between operative and inoperative positions relative to said top cam in which said top cam is stopped at selectable positions relative to said bottom cam.

19. The apparatus of claim 18 further comprising:
means being allocatable for engaging selected ones of said elevation stops to move the same from said operative to inoperative position.

20. The apparatus of claim 5 further comprising:
a plurality of azimuth stops mounted to said base, each azimuth stop being selectively movable from an inoperative to operative position relative to said bottom cam to block rotation of said bottom cam so as to maintain said bottom cam stationary at a selected azimuth position of the load supported on said top cam.

* * * * *